United States Patent Office 3,347,797
Patented Oct. 17, 1967

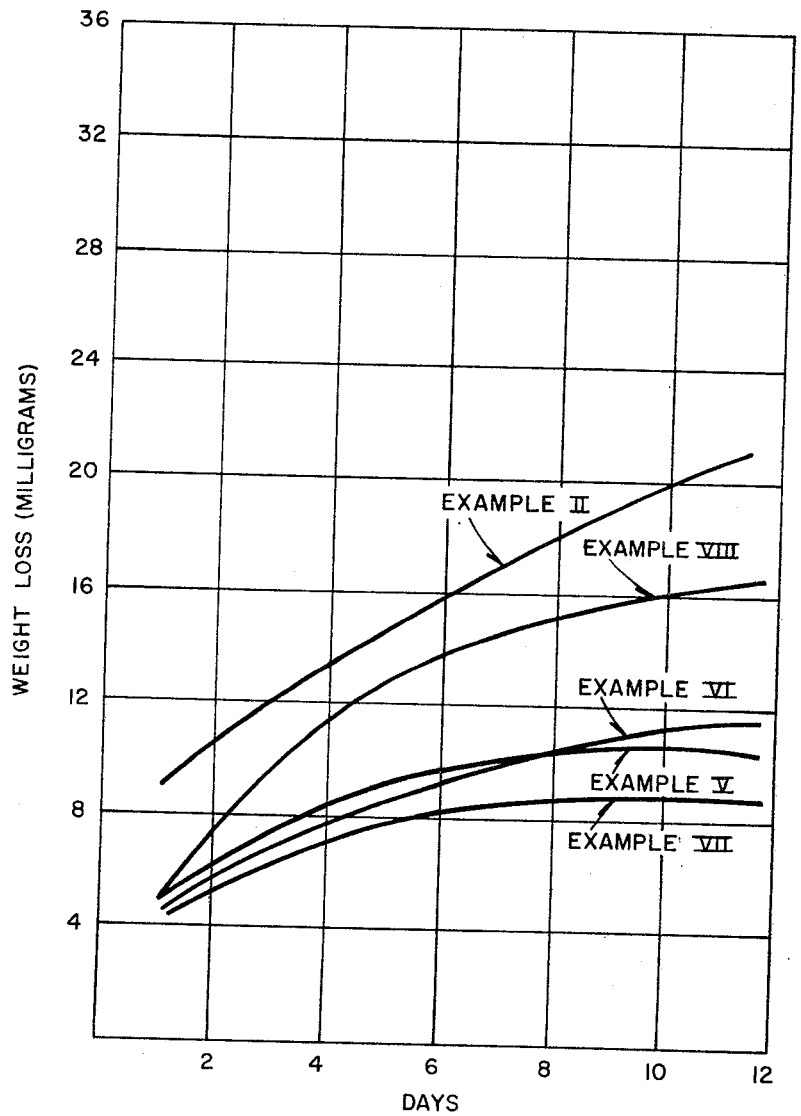

3,347,797
COMPOSITION AND METHOD FOR TREATING
FRESH COOLING WATER
Victor E. Kuegemann, Culver City, Calif., and Wayne L. Denman, Oak Park, and Charles B. Friedman, Chicago, Ill., assignors to W. R. Grace & Co., New York, N.Y., a corporation of Connecticut
Filed Aug. 3, 1966, Ser. No. 569,879
4 Claims. (Cl. 252—181)

ABSTRACT OF THE DISCLOSURE

Scale deposition from fresh water flowing in open recirculating cooling water systems is prevented by incorporating into the water a mixture of an alkali metal zinc polyphosphate, a surface active agent selected from the group consisting of aliphatic esters of a polyethylene glycol, condensates of at least 5 moles of ethylene oxide with the amide nitrogen of an aliphatic amide, and condensates of at least 5 moles of ethylene oxide with an aliphatic alcohol, and if desired for inhibiting corrosion, a water-soluble inorganic chromate. Mixtures of these components can be added to the cooling water system in amounts up to 100 p.p.m.

---

This application is a continuation-in-part of our copending application Ser. No. 350,148 filed Mar. 5, 1964, now abandoned, which is, in turn, a continuation-in-part of application Ser. No. 729,293 filed Apr. 18, 1958, which was copending therewith and is now abandoned.

The present invention relates to compositions and methods for treating fresh water flowing in an open recirculating evaporative cooling system, particularly to reduce the amount of adherent scale and corrosion caused by such circulation.

In any cooling tower, water acts as the heat transfer fluid, giving up heat to the atmosphere and then being recirculated through the system. The transfer of heat from the warmer water to the cooler air in a cooling tower is accomplished mainly by evaporation, but in some measure by sensible heat transfer. When the air enters the tower, its moisture content is generally less than saturation. It emerges at a higher temperature and with a moisture content approaching saturation. Evaporative cooling takes place even when the incoming air is saturated, because as the air temperature is increased in the process of absorbing sensible heat from the water, there is also an increase in its capacity for holding water vapor.

The loss of water from evaporation in a cooling tower amounts to approximately 1% of the water circulated for each 10° F. of cooling, provided the cooling is primarily the result of evaporation. Drift losses are generally about 0.1 to 0.2% of the water flow to the tower and must be added to the evaporative loss to account for all water lost in the practical cooling operation.

Cooling towers are generally classified by the means employed for producing air circulation through them. The three principal types are the atmospheric type, the natural draft type, and the mechanical draft type.

In atmospheric cooling, the air supply is dependent upon natural wind currents, blowing through the tower in a substantially horizontal direction. Louvers on all sides prevent water from being blown out of the atmospheric cooling towers and allow air to enter and leave independently of wind direction. Generally, these towers are located broadside to prevailing winds for maximum sustained air flow.

In natural draft towers, the natural convection of air flowing upward in contact with the water to be cooled provides the required heat transfer. Sensible heat absorbed by the air in passing over the water to be cooled increases the air temperature and reduces its density so that the air is forced upward and out of the tower by the surrounding heavier atmosphere. The flow of air through the tower varies with the difference in specific weights between ambient air and air leaving the heat transfer surfaces.

Mechanical draft towers depend upon fans for their air supply and may have the fans arranged to produce either a forced or induced draft. The latter are more commonly used than forced draft structures because of lower initial cost, improved air-water contact, and less recirculation. With controlled air flow, the capacity of the mechanical draft tower can be adjusted for economic operation in relation to heat load and in consideration of ambient conditions.

Cooling towers embody a number of different structural materials each of which provides some inherent problem when contacted with the flowing stream of fresh water. Distribution systems within the tower usually take the form of piping, normally composed of steel, and typically equipped with bronze spray nozzles. Structural framing within the tower may also be made of galvanized standard structural steel shapes. Fasteners for assembling the parts are usually bronze, stainless steel, or aluminum. Wood, particularly redwood, is the common material for structural framing, casing, louvers, filling, and drift eliminators.

The most common type of water formed deposit encountered in cooling water systems is calcium carbonate. It results from the break-down of calcium bicarbonate naturally present in all raw waters. Calcium carbonate has a relatively low solubility, and this solubility decreases with increases in temperature. In addition to the temperature factor, the solubility of calcium carbonate is also determined by the pH conditions maintained in the system and the total minerals present.

Another deposit likely to be encountered in cooling systems is calcium sulfate. In many cooling water installations, it is common practice to add sulphuric acid to the raw water to control scale deposits of calcium carbonate. Normally, sufficient acid is added to bring the pH of the water to the range of about 6 to 6.5. While the calcium sulfate which is produced by the reaction of the carbonate and sulphuric acid is much more soluble than the carbonate, it is entirely possible to exceed the solubility of calcium sulfate in the circulating cooling water and have that compound precipitated as a scale.

Calcium phosphate is also precipitated, particularly where improper treating methods are employed and high orthophosphate and calcium concentrations exist.

Iron containing deposits can result either from relatively high concentrations of iron being present in the raw water supply or by active corrosion taking place in the system.

Some water supplies also contain relatively large concentrations of silica which may result in the deposition of this material along the surfaces.

Wood surfaces of cooling towers are frequently presented with the problem of micro-organism growth. For example, algae and bacteria from the water and the air as well as fungi attach themselves to the wooden surfaces of the tower and result in the formation of a slime which in many instances poses as difficult a problem as scale deposits. The presence of slime interferes with normal heat transfer as well as accelerates the rotting of the wood.

The present invention is based upon the discovery that many of the serious problems presented by circulation of raw fresh waters through cooling towers can be minimized through the use of a treating agent containing a molecularly dehydrated inorganic phosphate and a non-ionic surface active agent. Where corrosion of metallic surfaces is a problem, the mixture may also include a corrosion inhibiting inorganic chromate.

Tests have conclusively demonstrated that the addition of the non-ionic surface active agents, even in amounts which might be considered trace amounts, substantially enhances the scale and corrosion inhibiting effectiveness of phosphates and phosphate-chromate mixtures. What is more, the use of the non-ionic surface active agent actually reduces the amount of the other treating agents required, particularly the chromate. This is particularly beneficial in areas where chromate disposal is a problem because of its effect upon marine life.

Another important advantage arising from the use of the compositions of the present invention is the fact that the cooling water system can be operated at a pH of say 6.5 to 7.5 instead of being more on the acid side, as previously. Particularly good results are obtained at a pH of 7.0 to 7.5. This not only reduces the cost by reducing the amount of acid required, but substantially reduces the possibility of copper corrosion in the system.

Another noticeable improvement to be gained by using the compositions of the present invention is their ability to remove existing slime from wooden surfaces of the tower, and to prevent substantially the redeposition of such slime. This is a characteristic which is not present in conventional phosphate-chromate compositions which have heretofore been used for treating cooling tower water.

An object of the present invention is to provide an improved method for treating a fresh water flowing in an open recirculating evaporative cooling system in order to reduce the amount of adherent scale deposited therefrom.

Still another object of the invention is to provide an improved method for inhibiting metallic corrosion in cooling water towers, while using less corrosion inhibitor than has heretofore been considered necessary.

Still another object of the invention is to provide a scale inhibiting composition which can operate at higher pH values than were commonly employed heretofore, with a resultant decrease in cost of treatment.

Another object of the invention is to provide a phosphate-chromate composition containing an additive which substantially enhances the corrosion and scale inhibiting effectiveness of the composition while permitting use of smaller amounts of chromates.

Another object of the invention is to provide a cooling water treating agent which is effective against the slimes frequently found on wooden surfaces of a cooling tower.

The invention is applicable to an extremely wide variety of non-ionic surface active agents. Most non-ionic surface active agents produced commercially today are made by treating an alcohol, a phenol, or a carboxy acid with ethylene oxide, usually in the presence of a small amount of an alkaline catalyst. A first mole of ethylene oxide adds to the hydroxyl group to form a beta-hydroxyethyl ether. A second mole of ethylene oxide then adds to the hydroxyl group of this ether, and so on, and the chain of ethenoxy groups is thus lengthened progressively. It is easily possible to build up chains of 50 or more ethenoxy units, if desired, and the properties of the finished surfactant depend to a considerable extent on the average number of ethenoxy units present. In general, the longer the ethenoxy chain, the higher the solubility of the surfactant in water.

Some non-ionic esters are made by the esterification of a fatty acid with a preformed polyethylene glycol. These glycols are made by adding ethylene oxide to ethylene glycol or to water and are in themselves heterogeneous mixtures of glycols having a range of molecular weight.

Among the best known non-ionic surfactants are the condensates of ethylene oxide with alkyl phenols. A large number of different alkyl phenols may be used, including monoalkylated, dialkylated, or polyalkylated, and condensed with 6 to 20 or more moles of ethylene oxide. Typical alkyl phenols used for this purpose are di-amyl phenol, p-tertiary-octylphenol, and nonylphenol.

Another class of non-ionic surface active agents are the polyethenoxy ethers of alcohols and mercaptans. Aliphatic alcohols of more than 8 and preferably from 10 to 24 carbon atoms form polyethenoxy ethers which have appreciable surface activity. At least 5 moles of ethylene oxide are condensed with the hydroxy oxygen of the aliphatic alcohol. Most of the alcohols whose sulfates are commercially available have been converted to polyethenoxy ethers. These include not only the alcohols derived from the naturally occurring fatty acids but also various branched chain higher alcohols as disclosed in Patent No. 2,508,035, for example.

Mercaptans add readily to ethylene oxide to form polyethenoxy derivatives. Higher alkyl mercaptans of the type designated by the formula RSH, where R is a straight chain alkyl group in the $C_{10}$ to $C_8$ range are made from the corresponding alkyl chloride and NaSH.

Another class of non-ionic surface active agents includes the difunctional and polyfunctional polyethenoxy ethers. These materials are prepared by treating bis-phenols with ethylene oxide. The bis-phenols can be prepared by heating a 2,4-dialkyl phenol with formaldehyde in the presence of a strong acid.

Particularly economical surface active materials are the polyethenoxy esters made by reacting ethylene oxide with carboxylic acids, such as the polyethenoxy ester of tall oil acids. In reacting fatty acids or tall oil with ethylene oxide, the dry alkali metal soap of the acid is used as a catalyst, and the temperature of reaction is usually 150° C. or above. Condensates with polycarboxylic acids can be used, but derivatives of mono-carboxylic acids are preferred.

Other non-ionic surface active agents have been made from the fatty acids of oxidized paraffin wax. Still other raw materials which can be reacted with polyglyclos to yield non-ionic surfactants are dimerized linoleic acid and alkylated benzoic acids. Naphthenic acids have also been reacted with ethylene oxide to form strong surface active esters. Still other suitable starting materials among the carboxylic acid include the alkylcyclohexene-carboxylic acids, rosin acids, modified rosin acids, and the long chain alkyl ethers of thioglycolic acid.

An important class of non-ionic surface active agents for the purposes of this invention are the esters produced by reacting fatty acids with polyethenoxylated polyols. The surfactants of this class include materials such as "Tweens" in which the polyol employed is a mixture of anhydrosorbitols. Other polyols which have been used for this type of synthesis include glycerol, polyglycerol, pentaerythritol, and the glucosides.

The higher alkyl phosphates can be recated with ethylene oxide or with polyglycols to form mixed esters which are essentially ester-linked polyethenoxy non-ionics in which the linkage is formed by the trifunctional inorganic acid, $H_3PO_4$. Analogous compounds have been prepared from the alkyl pyrophosphates, polyphosphates, and phosphonates. More than one alkyl group can be linked to the phosphate radical, and the alkyl groups can be derived from the straight chain fatty alcohols or from alcohols of petrochemical origin.

Fatty acid alkanolamides of the type $RCONHC_2H_4OH$ react with ethylene oxide quite readily to yield polyethenoxy derivatives in which the polyglycol chain is attached to hydroxyl group rather than to the amide nitrogen. Polyethenoxy alkalolamides of fatty acids are available commercially under the name "Ethomid." Condensates of at least 5 moles of ethylene oxide with the amide nitrogen of an aliphatic amide having from 10–24 carbons such as "Ethomide HT" can be used.

The alkylarylsulfonamides have been ethenoxylated to form surfactant materials. Similar products are obtained by reacting alkylbenzenesulfonyl halides or alkanesulfonyl chloride with amines and ethenoxylating. Other nitrogenous intermediates which form non-ionic surfactants when treated with ethylene oxide are the long chain carbamates and the long chain hydroxyalkyloxazolines.

Fatty acid guanylureas have been reacted with ethylene oxide to produce water-soluble non-ionic surfactant agents. The fatty acid chloride is first condensed with dicyandiamide to form an acyl derivative from which the cyano group is hydrolyzed with acid, and the resulting fatty acid guanylurea is treated with ethylene oxide. Similarly, symetric dialkylarylthioureas may be reacted with from 20 to 35 moles of ethylene oxide to produce water soluble surface active materials.

Aromatic amines can also be used as linkages between a fatty acyl hydrophobic radical and a solubilizing polyethenoxy chain. Typical compounds of this nature which have been described in the literature are shown below:

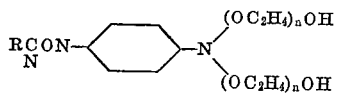

and

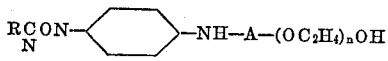

where A is the radical of a polyol such as glycerol or a sugar alcohol.

Not all non-ionic surfactants have polyethenoxy chains in their structure. The best known members of this class are the esters of the sugar alcohols, sorbitol and mannitol. These materials are mixtures of esters in which the sorbitol portion of the molecule is partly esterified and partly dehydrated before esterification to form the cyclic inner ethers monoanhydrosorbitol and dianhydrosorbitol.

Fatty acid esters of the di- or polysaccharides, such as sucrose or dextrine are also suitable materials. Gluconamides prepared by condensing a primary amine in the surface active range with delta-gluconolactone can also be employed.

Many different types of non-ionic surfactants have been based upon glucose because of its relatively low cost. Hydroxypropyglucoside can be prepared from propylene glycol and glucose and then esterified with fatty acids, and further reacted by condensation with ethylene oxide. When glucose is condensed with ethylene chlorohydrin in the presence of acid catalysts, beta-chloroethylglucoside is produced. Two moles of this hydrophilic halide can be reacted with one mole of ammonia to form the bis-glucoside of diethanolamine. When the amino group of this material is acylated with lauric acid, a water soluble surfactant is produced.

Glucose can also be converted to a glucamine or N-alkylated glucamine. The glucamines can be prepared by the hydrogenation of a mixture of glucsoe with ammonia or a lower primary amine.

The fatty acyl derivatives of alkanol amines are surface active and water soluble, provided that there is a sufficient number of hydroxyl and/or ether groups in the alkanol amine from which they are made. For example, glycerylamines of good solubility can be produced by reacting ammonia with the cyclic ketal formed from monochlorohydrin or epichlorohydrin and acetone, and hydrolyzing the resulting amine to hydrolize the acetal linkages.

Of all the non-ionic surfactants available for this use, we particularly prefer to employ condensates of ethylene glycol, propylene glycol, or mixtures of ethylene oxide and propylene oxide, or derivatives of these condensates, namely the esters, ethers, amines, amides, thioethers, or thioesters. Within this sub-class, the particularly preferred compound are those which result from the esterification of a polyethylene glycol having a molecular weight of 200 to 20,000 with a 10 to 24 carbon atom carboxylic acid. These esters can conveniently be prepared by reacting stoichiometric amounts of the glycol and the acid at temperatures ranging from about 150 to 200° C. in the presence of a catalyst such as sulphuric acid, benzene sulfonic acid, or boron trifluoride.

In accordance with the present invention, the non-ionic surface active agent is added in extremely small amounts to a phosphate scale inhibitor of the type which is known in the art as a molecularly dehydrated phosphate, which may be of the alkali metal polyphosphate type or the polyvalent metal polyphosphate type. The most effective phosphates which we have found are the alkali metal phosphates having a ratio of alkali oxide to phosphorus pentoxide ranging from about 0.4 to 1 to about 2 to 1. Phosphates which fall within this class include compounds such as sodium septaphosphate, sodium tetraphosphate, sodium hexametaphosphate and sodium decaphosphate.

The polyvalent metal glassy phosphates such as sodium-zinc polyphosphates are particularly valuable for this use because the presence of the zinc ion contributes to the efficacy of the composition. Typical formulas for several of these polyvalent metal polyphosphates are given in the following table:

TABLE I $8Na_2O \cdot 8P_2O_5 \cdot ZnO$
$8Na_2O \cdot 8P_2O_5 \cdot MgO$
$8Na_2O \cdot 8P_2O_5 \cdot MnO_2$
$16Na_2O \cdot 16P_2O_5 \cdot MnO_2 \cdot MgO$
$24Na_2O \cdot 24P_2O_5 \cdot MnO_2 \cdot ZnO$ Some improvement in corrosion inhibiting effectiveness may also be achieved by employing a molecularly dehydrated polyphosphate in combination not only with chromates or dichromates but also with ferrocyanide ions; and in further combination with metallic cations such as zinc, cobalt, cerium, chromium, manganese, cadmium, lead, tin, and nickel.

In addition, the corrosion inhibiting effectiveness of phosphate compounds in some instances can be increased by mixing such phosphates with cupric chloride, and such combinations are also within the scope of our invention.

The chromates which are useful for the purpose of the invention include various water soluble metallic chromates and dichromates such as sodium chromate, potassium chromate, and zinc dichromate or mixtures thereof. The chrome-glucosates (a glucose molecule with four substituent chromate radicals) may also be employed for the purposes of this invention.

The dosage levels for the various ingredients will, of course, vary with the circumstances. The inclusion of the non-ionic surface active agent gives beneficial results when combined with as little as 3 parts per million or so of phosphate. Generally, the phosphate concentration will run from 5 to 75 parts per million. The amount of chromate will generally be from 3 to 20 parts per million. As a general rule, the amount of surface active agent added ranges from 1 to 10% of the phosphate (or the phosphate-chromate combination). In any event, the surface active agent need not be added in amounts greater than 10 parts per million of the circulating water, and a range of 0.1 to 10 parts per million of the surface active agent will be effective in substantially all cases. Indeed, a surface active agent concentration of 0.5 to 2 parts per million will be sufficient to treat all but exceptional cases.

Our experience has shown that it is never necessary to exceed a total of 100 parts per million of the combination (phosphate plus surface active agent or phosphate-chromate plus surface active agent) in any cooling tower of reasonable efficiency, and that it is rarely necessary to go above 50 parts per million.

Where the combination of polyphosphate and chromate is employed, it is desirable to keep the ratio of phosphate to chromate in the range of from ½ to 10 parts by weight of polyphosphate for every part by weight of chromates.

In addition to the foregoing additives, the composition of the present invention may also include other additives customarily employed in cooling water treatment. For example, biocides may be added to the composition in suitable dosages, whereby their efficiency will then be enhanced.

Examples

For the determination of corrosion inhibiting effectiveness, we employed a commercial cooling tower, equipped with suitable control instruments and auxiliary equipment. The pilot tower had means for providing automatic pH control.

Air was forced through the tower at a rate of about 1800 cubic feet per minute by a blower. Cooling water was circulated at a rate of 13 gallons per minute by means of a positive displacement pump and left the tower at a temperature of about 100° F. Flow of the tower water was divided into two streams, one entering a heat exchanger and one by-passing it. In the heat exchanger, the water was heated to about 135° F. by heat exchange with steam. The heated effluent was combined with the by-passed water to produce a solution having a temperature of approximately 130° F. and this solution was then passed into a cylindrical chamber, the water passed through removable test nipples, over coil testers, and was then sprayed into the cooling tower proper. Water which entered the tower at about 30° F. was cooled about 30° F.

Feed solutions of corrosion inhibitors being tested were stored in stainless steel containers and fed continuously into the cooling tower by a positive displacement pump.

A typical analysis of the tap water used in the experiments is given in the following table:

TABLE II

| | P.p.m. |
|---|---|
| Total dissolved solids | 230 |
| Organic matter | Trace |
| pH | 8.0 |
| Phenolphthalein alkalinity as $CaCO_3$ | None |
| Methyl orange alkalinity as $CaCO_3$ | 118 |
| Hardness as $CaCO_3$ | 130 |
| Silica as $SiO$ | 2 |
| Iron as $Fe$ | 0.2 |
| Calcium as $Ca$ | 36 |

Prior to the tests, the water was circulated through the tower to build up a dissolved solids content of from 1800 to 2000 p.p.m.

The scale formation in the cooling tower was determined in the following manner. At the end of a ten day test run, the water from the tower was drained and fresh tap water was added. After the water had circulated from 5 to 10 minutes, a sample was taken and a calcium ion and magnesium ion content were determined by means of an analysis with ethylene diamine tetraacetic acid. About 1000 grams of the tetrasodium salt of ethylene diamine tetraacetic acid was dissolved in a portion of the cooling tower water and then added to the tower. The water was circulated through the tower overnight, with the heat and blower off, and with no makeup water allowed to enter the tower.

A sample of the circulated water was then taken for calcium ion and magnesium ion determinations.

After the circulating water had been drained from the tower, fresh tap water was added. After the water had circulated for about 10 minutes, a sample was taken and again the calcium ion and magnesium ion contents were determined.

Subsequently, about 1000 grams of the tetra sodium salt of ethylene diamine tetraacetic acid were added to the cooling tower water as previously described. This water was allowed to circulate through the tower for about 4 hours. A sample was taken for analysis, and a normal rinsing operation was started in the tower.

The quantity of calcium and magnesium determined by analysis, minus the quantity of calcium and magnesium found prior to the addition of ethylene diamine tetraacetic acid was taken to be scale formed in the system. Blank test runs were made to determine the amount of calcium scale formed without the use of any additives.

Representative corrosion curves from the following examples have been plotted on the attached sheet of drawings in which the ordinates represent the corrosion loss in milligrams and the abscissae represent the elapsed time in days.

Example I

The mono-oleate ester of a polyethylene glycol having a molecular weight of about 400 was added alone to the tower at a dosage of 0.6 part per million. It was found that the scale formation was reduced by about 90% at a pH of 7.5 and that existing micro-organism growth was removed. While corrosion occurred at the start of this test, the corrosion data indicated that there was a leveling off after 7 days whereas the untreated cooling water exhibited a fairly constant increase in corrosion through the entire test period.

Example II

In this run, a standard corrosion inhibiting composition containing 30 parts by weight of sodium polyphosphate containing 67% $P_2O_5$ and 20 parts by weight of sodium chromate are employed at a total dosage level of 50 parts per million. At a pH of 7.5, the use of this corrosion inhibiting composition reduced the amount of scale about 36%. The corrosion curve for this material is indicated on the drawings.

Example III

To the corrosion inhibitor specified in the preceding example, we added 2 parts per million of the dioleate ester of polyethylene glycol 400. At the end of the test period, it was observed that the amount of calcium scale had been reduced by a factor of 48%, micro-organism slime had been eliminated, and that the total corrosion had been reduced after all measured time intervals, and the rate of corrosion had been reduced practically to zero after about 5 days.

Example IV

To the corrosion inhibiting composition of Example II, we added 0.6 part per million of the mono-oleate ester of polyethylene glycol 400. The pH of the circulating water was maintained at 6.5. At the end of the test period, it was found that the corrosion of the test coupons measured less than that of the composition of Example II, and the corrosion rate had been reduced to practically zero in all instances.

Example V

The corrosion inhibiting composition of Example II was combined with 0.6 part per million of the dilaurate ester of polyethylene glycol 400. Test measurements were made at a pH of 7.0. With this combination, it was found that calcium scale formation was completely eliminated at the end of the test period, and micro-organism slime removed. As evident from the corrosion curve, the total corrosion and rate of corrosion had both been substantially reduced.

Example VI

In this example, we added 0.6 part per million of the mono-oleate ester of polyethylene glycol 200 to the corrosion inhibitor of Example II and operated at a pH of 7.0. The calcium scale reduction was complete as in the previous example, and the corrosion inhibiting curve, as indicated in the drawings, reflected the same type of improvement.

Example VII

About 0.6 part per million of the mono-oleate ester of polyethylene glycol 6000 was added to the inhibiting composition of Example II and operated at a pH of 7.0. Again, the reduction of calcium scale was complete at the end of the ten day test period and the corrosion curve was improved to the extent indicated in the drawings.

Example VIII

The corrosion inhibitor of Example II was combined with 0.6 p.p.m. of the dioleate ester of a polyalkylene glycol prepared by reacting propylene glycol with propylene oxide to build up a block polymer polyoxypropylene glycol. This compound, containing about 10 to 12 oxypropylene groups was then reacted with ethylene oxide to provide a glycol having oxyethylene linkages at opposed ends of the oxypropylene block polymer, and having a molecular weight of about 2700. This compound was then esterified with two moles of oleic acid. It was found that the combination of the polyalkylene glycol derivative reduced the scale very substantially and a more favorable corrosion inhibiting curve was obtained, as indicated on the drawings.

Example IX (a non-toxic composition)

Fifty parts per million of "Calgon-TG," a sodium-zinc glassy polyphosphate, and 0.6 p.p.m. polyethylene glycol 400 mono-oleate were fed in the experimental cooling tower at a pH of 7.0 and temperature of 130° F. The corrosion rate was more favorable than that observed with "Calgon-TG" alone and the amount of calcium scale was reduced substantially 100%.

Example X

Fifty parts per million of a zinc dichromate formula, and 0.6 p.p.m. polyethylene glycol 400 mono-oleate were fed similarly to Example IX. The corrosion rate was depressed, and the amount of calcium scale was reduced as compared with the use of the zinc dichromate formula alone.

Example XI

Excellent corrosion inhibition and scale reduction results when a zinc polyphosphate chromate composition is fed together with 0.6 p.p.m. polyethylene glycol 400 mono-oleate, similarly to Example IX.

Example XII

This example shows the scale inhibition which can be obtained by the process of this invention. The compositions of this invention were tested to determine the inhibition of calcium phosphate scale.

The test solution was formed by mixing 10 gallons of filtered tap water containing 20 p.p.m. of disodium phosphate and sufficient NaOH to adjust the pH to 8.5 with the agent being tested. Each solution was pumped with a Sigma pump through the stainless steel coil in a 99°–100° C. bath and out to a drain. After the ten gallons of water had been pumped through the coil, the coil was removed from the bath and emptied of the remaining water. The coil was rinsed by forcing about 200 ml. of distilled water through it. Then the coil outlet was connected to a one liter volumetric flask. Three hundred ml. of 1:9 hydrochloric acid were forced through the coil in several portions, alternating with distilled water, until the liter flask was filled to the mark. A 25 ml. aliquot was made just basic to litmus with 1:2 ammonium hydroxide and then titrated with N/50 Versenate reagent for hardness. This was repeated for several aliquots, and the average titration calculated.

The calcium phosphate scale reduction is calculated by a comparison of the quantity of scales obtained with and without the treatments.

Ten p.p.m. of "Calgon T-G," a zinc sodium polyphosphate, and one p.p.m. of "Sulfonic TD–90," an ethoxylated long chain alcohol having between 10 and 24 carbons in the aliphatic group with more than 5 ethoxy groups condensed with the alcohol, are added to the test solution.

The scale reduction obtained is substantially 100 percent.

Example XIII

In this example the scale inhibiting properties of a zinc sodium polyphosphate and a polyethylene glycol ester of oleic acid having a molecular weight of about 400 is shown. The compounds are tested as described in Examples XII, the test solution containing 10 p.p.m. of the polyphosphate and 1 p.p.m. of the non-ionic surfactant.

The scale reduction obtained is substantially 100 percent.

Example XIV

In this example the scale inhibiting properties of a zinc sodium polyphosphate and "Ethomid HT," a non-ionic polyethoxylated hydrogenated tallow amide with about 50 ethoxy groups condensed with the amide nitrogen is shown. The compounds are tested as described in Example XII, the test solution containing 10 p.p.m. of the polyphosphate and 1 p.p.m. of the non-ionic surfactant.

The scale reduction obtained is substantially 100 percent.

From the foregoing examples and numerous other tests, it will be apparent that the addition of extremely small amounts of the non-ionic surface active agent (less than 1 part per million) provides very substantial benefits in the treatment of fresh waters used in cooling towers. Such fresh waters actually present greater problems due to scaling and corrosion than waters containing higher concentration of electrolytes. Fresh waters (waters in which the calcium and magnesium concentration are greater than the sodium concentration, and the chloride concentration is not in excess of about 4000 parts per million) have a maximum amount of dissolved gases, particularly oxygen which accentuate corrosion. Furthermore, such fresh waters contain carbon dioxide which complicates the corrosion problem and/or the scaling problem. What is more, the compositions of the present invention, because of the low dosage levels, do not provide a foaming problem, despite the severe agitation and whipping which the water may undergo in being aerated in its passage through the tower.

It should be evident that various modifications can be made to the described embodiments without departing from the scope of the present invention.

What is claimed is:

1. The method of conditioning surfaces subject to scale deposition from fresh water flowing in an open recirculating cooling water system which comprises incorporating into said water a mixture of a sodium zinc polyphosphate and at least one water-soluble surface active agent selected from the group consisting of
   (a) aliphatic esters of a polyethylene glycol,
   (b) condensate of at least 5 moles of ethylene oxide with the amide nitrogen of an aliphatic amide, and
   (c) condensates of at least 5 moles of ethylene oxide with an aliphatic alcohol,
the aliphatic group in each agent being a fatty alkyl group having from 10 to 24 carbons, the amount of surface active agent constituting from 1 to 10 wt. percent of the mixture, and the amount of the mixture being added being not in excess of 100 p.p.m.

2. The method of claim 1 wherein the mixture contains a corrosion inhibiting water-soluble inorganic chromate, the wt. ratio of polyphosphate to chromate being 0.5–10:1 in the mixture.

3. A composition for treating fresh water flowing in an open recirculating cooling water system consisting essentially of a mixture of a sodium zinc polyphosphate and at least one water-soluble surface active agent selected from the group consisting of
(a) aliphatic esters of a polyethylene glycol,
(b) condensate of at least 5 moles of ethylene oxide with the amide nitrogen of an aliphatic amide, and
(c) condensate of at least 5 moles of ethylene oxide with an aliphatic alcohol,
the aliphatic groups in each agent being a fatty alkyl group having from 10 to 24 carbons, and the amount of surface active agent constituting from 1 to 10 wt. percent of the mixture.

4. The composition of claim 3 wherein the composition contains a corrosion inhibiting water-soluble inorganic chromate, the wt. ratio of polyphosphate to chromate being 0.5–10:1 in the mixture.

References Cited

UNITED STATES PATENTS 2,711,391   6/1955   Kahler _____ 252—175 X
2,913,420   11/1959  Alderman et al. _____ 252—389

LEON D. ROSDOL, *Primary Examiner.*

M. WEINBLATT, *Assistant Examiner.*